E. J. GOULD.
FLY TRAP.
APPLICATION FILED JUNE 16, 1913.
1,103,578.
Patented July 14, 1914.
2 SHEETS—SHEET 1.
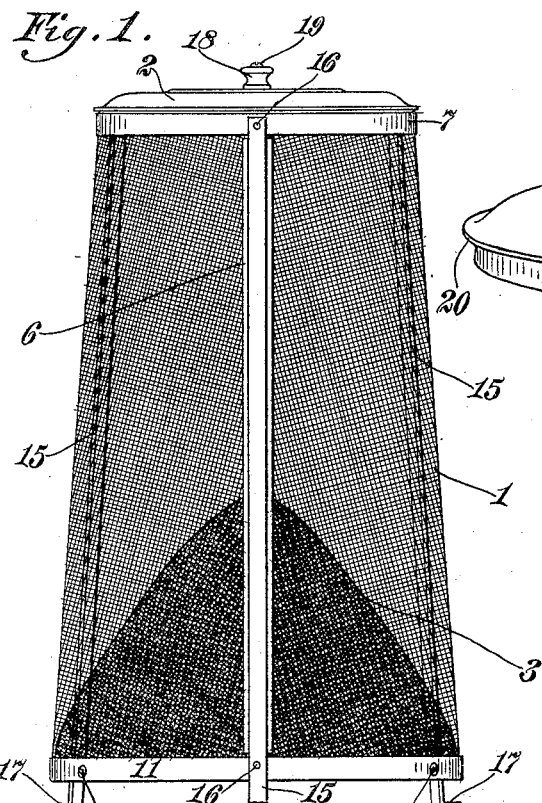
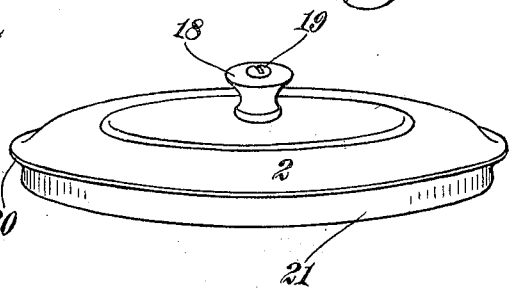
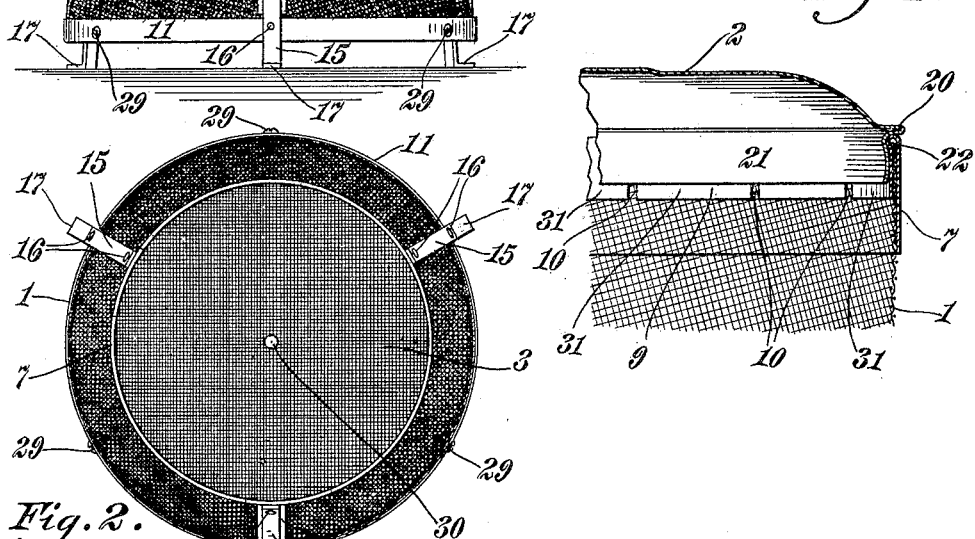

E. J. GOULD.
FLY TRAP.
APPLICATION FILED JUNE 16, 1913.
1,103,578.
Patented July 14, 1914.
2 SHEETS—SHEET 2.
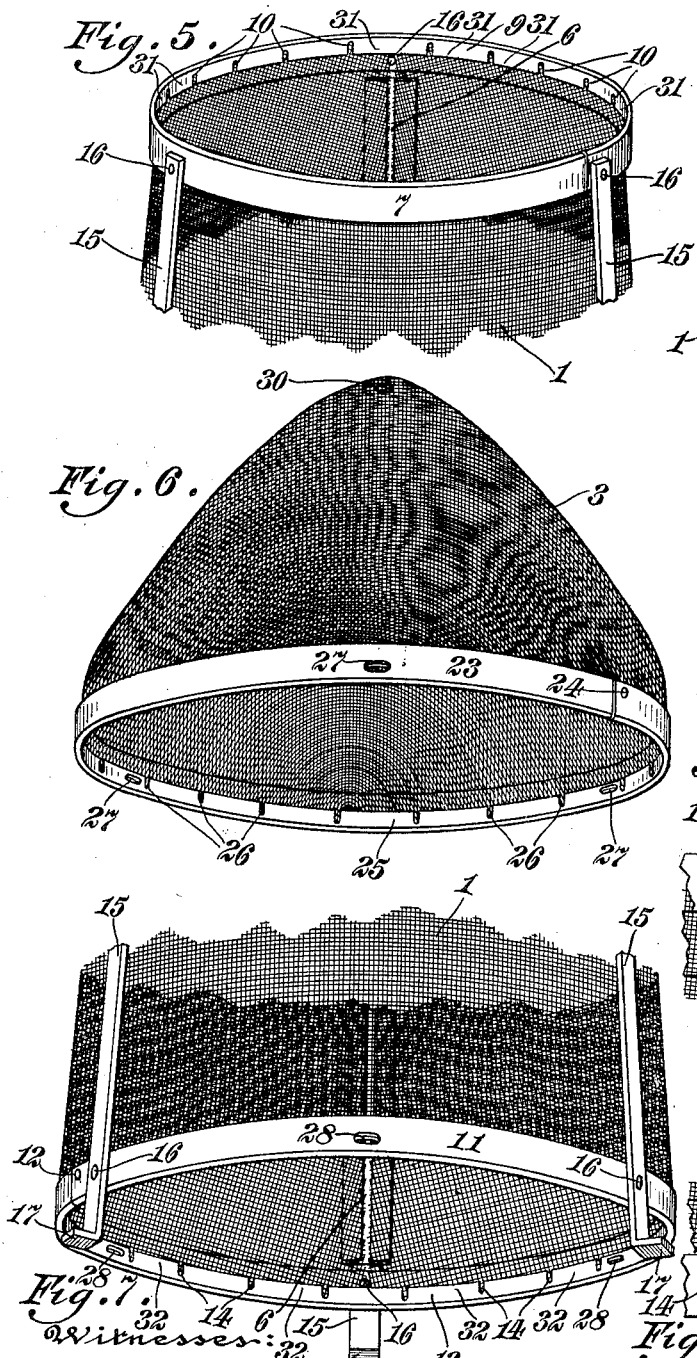
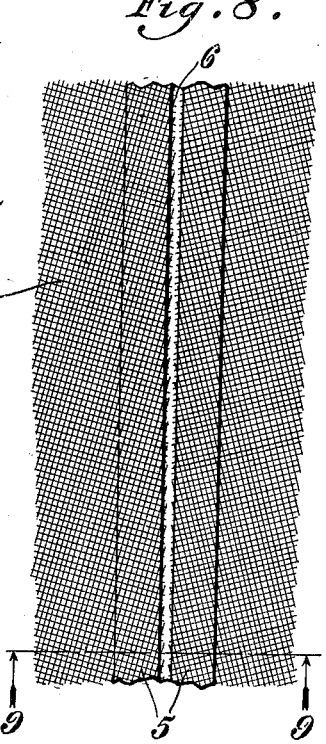
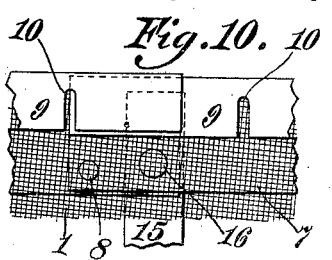
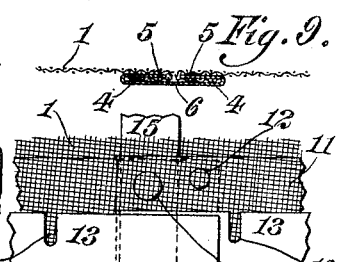
Witnesses:
George G. Anderson.
Harry H. Peiss.
Inventor:
Edwin J. Gould,
By Hugh K. Wagner
His Attorney.

UNITED STATES PATENT OFFICE.

EDWIN J. GOULD, OF ST. LOUIS, MISSOURI, ASSIGNOR TO THE LUDLOW-SAYLOR WIRE COMPANY, OF ST. LOUIS, MISSOURI, A CORPORATION OF MISSOURI.

FLY-TRAP.

1,103,578. Specification of Letters Patent. Patented July 14, 1914.

Application filed June 16, 1913. Serial No. 773,824.

*To all whom it may concern:*

Be it known that I, EDWIN J. GOULD, a citizen of the United States, residing at the city of St. Louis, State of Missouri, have invented certain new and useful Improvements in Fly-Traps, of which the following is a specification.

This invention relates to fly-traps, and has for its object to provide a generally improved fly-trap which is strongly and economically built and has a relatively large capacity. Naturally it is adapted to catch other insects besides flies.

With the above objects in view, the invention resides in the novel features of construction and arrangement of parts hereinafter more fully described and pointed out in the claim.

In the accompanying drawings forming part of this specification, in which like numbers of reference denote like parts wherever they occur, Figure 1 is a side elevation of an improved fly-trap embodying the present invention; Fig. 2 is a top plan view of same with the cover removed; Fig. 3 is a perspective view of the cover; Fig. 4 is a transverse sectional view, on an enlarged scale, of a portion of the cover and a portion of the upper end of the body; Fig. 5 is a fragmentary perspective view, on an enlarged scale, of the upper end of the body; Fig. 6 is a perspective view, on an enlarged scale, of the bottom; Fig. 7 is a fragmentary perspective view, on an enlarged scale, of the lower end of the body; Fig. 8 is an interior elevation, on an enlarged scale, of part of the wall of the body; Fig. 9 is a sectional view on the line 9—9, Fig. 8; Fig. 10 is an interior elevation, on an enlarged scale, of part of the upper end of the body; and Fig. 11 is an interior elevation, on an enlarged scale, of part of the lower end of the body.

In accordance with the present invention the body 1 of the fly-trap, is provided with a cover 2 and a bottom 3. The body has the shape of a frustum of a cone, and is formed of wire-netting. The side edges 4 of the wire-netting meet at one side of the body 1, and are folded outwardly in opposite directions from each other to extend underneath and be held securely by the inwardly-folded side edges 5 of a strip 6 of sheet metal, as best seen in Figs. 8 and 9, said strip extending from the top to the bottom of the body. An annular strip 7 of sheet metal encircles the upper edge of the body 1, with its ends overlapped and secured together by a rivet 8 or other suitable means, and has its upper portion 9 folded inwardly to cover and hold the upper edge of the body 1, transverse elongated notches 10 being formed in the portion 9 so that, when the latter is folded inwardly, it will hold the upper edge of the body 1 flatly and securely against the inner surface of the strip 7, as depicted in Fig. 5. Another annular strip 11 of sheet metal encircles the lower edge of the body 1, with its ends overlapped and secured together by a rivet 12 or other suitable means, and is like the upper annular strip 7 inverted, the lower portion 13 having elongated notches 14 formed therein and being folded inwardly to hold the lower edge of the body 1 flatly and securely against the inner surface of said strip 11, as illustrated in Fig. 7. The strips 7 and 11 are connected by a plurality of bars 15 (preferably three in number), which are secured to said strips by rivets 16 or other suitable means and are located outside the body 1, the lower ends of said bars extending beyond the lower strip 11 and being provided with outwardly-turned feet 17, so as to support the lower end of the body 1 at a sufficient distance above the floor or other support to allow the flies and other insects to pass underneath same. The bars 15 hold and support the annular strips 7 and 11 in spaced relation and thereby hold the wire netting taut, being spaced apart at substantially equal distances around the body 1, one of the bars extending along the outer face of the strip 6, as shown in Fig. 1, so as to brace said strip 6 and hold same in place. Said bars 15 are, also, arranged so that the rivet 16 which secures one of the bars 15 to the upper strip 7 passes through both ends of the latter, as depicted in Fig. 10, and the rivet 16 that secures one of the bars 15 to the lower strip 11 passes through both ends of the latter, as shown in Fig. 11.

The cover 2 is preferably formed of sheet metal, and has a handle 18 fastened thereto by a bolt 19 or other suitable means. The peripheral portion of the cover 2 is folded under to form an outwardly-extending rim 20 and then extended downwardly to form an annular depending flange 21 of such diameter as to fit within the upper annular strip 7, the lower portion of said flange protuberating slightly outwardly. Due to the manner in which the upper portion of the annular strip 7 is folded inwardly to clamp the upper edge of the body 1, the fold 22 in the former protuberates slightly inwardly as shown in Fig. 4. By this arrangement, when the cover 2 is placed in position to close the top of the body 1, the outwardly protuberant portion of the flange 21 will fit snugly against the inner surface of the folded edge 9 of the upper annular strip 10 underneath the inwardly protuberant fold 22, and the rim 20 will rest upon the top of the fold 22 as depicted in Fig. 4. In this manner the flange 21 and fold 20 coöperate to hold the cover in place. It will further be seen that the spaced notches formed in the part 9 of the strip 7 provides an annular series of independent fingers 31 which have spring properties, which fingers, being resilient, will allow the flange 21 of the cover to be easily inserted in and removed from the body, and will, also, exert sufficient pressure on the flange 21 to hold the cover firmly in place.

The bottom 3 is preferably cone-shaped and is formed of wire-netting, the lower edge of which is encircled by an annular strip 23 of sheet metal. The ends of the strip 23 are overlapped and secured together by a rivet 24 or other suitable means, and the lower portion 25 of said strip has elongated notches 26 formed therein and is folded inwardly to clamp the lower edge of the bottom 3 flatly and securely against the inner surface of the strip 23, as depicted in Fig. 6. The annular strip 23 is of such size diametrically that it will fit snugly within the lower annular strip 11 of the body 1 and is provided with a plurality of openings 27, which, when the bottom 3 is inserted into position in the lower end of the body 1, register with openings 28 in the lower annular strip 11 to receive bolts 29 by means of which said bottom 3 is held in place. The openings 27 and 28 are preferably elongated and are located midway between the bars 15, being formed in the bodies of the strips 23 and 11 and, also, in the folded parts 25 and 13, respectively. The cone-shaped bottom 3 has an opening 30 in its apex to allow the flies and other insects to pass from below the bottom 3 into the interior of the body 1 wherein same may be destroyed.

It will be evident that the fly-trap hereinabove described is strongly built, and by reason of it being relatively tall and, also, relatively large in diameter, has a large space in which to trap flies and other insects. Because of the body 1 being relatively taller than the cone-shaped bottom 3, the wire netting forming the former is composed of coarser woven and larger wires than the wire netting forming the bottom 3. Furthermore, the cover 2, bars 15, strips 6, 7, 11, and 23, and the wire-netting forming the body 1 and the bottom 3 are preferably galvanized or formed of non-corrosive metal, thus rendering the fly-trap well adapted for use in dairies, market places, and elsewhere. The fact that the bottom 3 can be removed enables a large number of bodies 1 to be nested in an obvious manner, as can, also, a large number of bottoms 3, for convenience in shipping. It will, also, be seen that the notches 14 in the annular strip 11 provide resilient fingers 32, which act to hold the bottom 3 in position within the strip 11 to assist the operator in easily and quickly effecting registry of the bolt apertures 27 and 28 in assembling the parts mentioned.

I claim:

An insect trap comprising a body formed of a section of wire-netting bent in the shape of a truncated cone, a metal strip covering and connecting the side edges of the wire-netting, annular metal strips covering the upper and lower edges of the body, a cover for the upper end of the body, an open apex wire-netting cone fitting within the lower end of the body, an annular metal strip covering the lower edge of said cone and being detachably secured to the lower strip of the body, and means connecting the upper and lower strips of the body and extending beyond the lower strip to form feet, one of said means being arranged to overlie the said metal strip that connects the wire-netting of which the body is formed.

In testimony whereof I hereunto affix my signature in the presence of two witnesses.

EDWIN J. GOULD.

Witnesses:
 JAS. P. DAWSON,
 GLADYS WALTON.